(12) United States Patent
Luzzi et al.

(10) Patent No.: US 7,925,684 B2
(45) Date of Patent: Apr. 12, 2011

(54) METHOD AND APPARATUS FOR DISTRIBUTING RANDOM ELEMENTS

(75) Inventors: Raimondo Luzzi, Graz (AT); Marco Bucci, Graz (AT)

(73) Assignee: Infineon Technologies AG (DE)

( * ) Notice: Subject to any disclaimer, the term of this patent is extended or adjusted under 35 U.S.C. 154(b) by 1089 days.

(21) Appl. No.: 11/676,133

(22) Filed: Feb. 16, 2007

(65) Prior Publication Data

US 2008/0201395 A1    Aug. 21, 2008

(51) Int. Cl.
*G06F 1/02*    (2006.01)
(52) U.S. Cl. .................................. 708/250; 708/254
(58) Field of Classification Search .............. 708/250, 708/254
See application file for complete search history.

(56) References Cited

U.S. PATENT DOCUMENTS 5,729,686 A * 3/1998 Heck et al. .................... 709/208
2003/0158876 A1 * 8/2003 Hars ............................. 708/250

FOREIGN PATENT DOCUMENTS

DE    39 33 846 A1    4/1990

* cited by examiner

*Primary Examiner* — Chuong D Ngo
(74) *Attorney, Agent, or Firm* — Dickstein Shapiro LLP

(57) ABSTRACT

Apparatus for distributing valid random elements, including at least a first module and a second module. The first module is connected to a provider of valid random elements and to the second module. The first module includes a controller that passes valid random elements from the first module to the second module.

25 Claims, 2 Drawing Sheets

METHOD AND APPARATUS FOR DISTRIBUTING RANDOM ELEMENTS

FIELD OF THE INVENTION

The invention concerns a method for distribution of random elements to at least two modules and an apparatus for distributing random elements.

BACKGROUND

Due to their unpredictability random numbers are used in many applications. Pseudo-random number generators are given an initial value, the so-called "seed", by an external source of random elements to calculate a sequence of random numbers. The source of random elements is a true random number generator which is based on non-deterministic phenomena that act as a source of randomness.

An apparatus may contain tore than one module which requires random elements. Every module can be provided with its own source of random elements. Alternatively, the application may use only one source of random elements and distribute the random elements to the different modules. In this case the same random element should not be used as an input for more than one module to avoid a correlation of the output of the different modules.

BRIEF DESCRIPTION OF THE DRAWINGS

The invention will be explained in more detail below using exemplary embodiments with the aid of the figures.

DETAILED DESCRIPTION OF THE INVENTION

Figure 1:
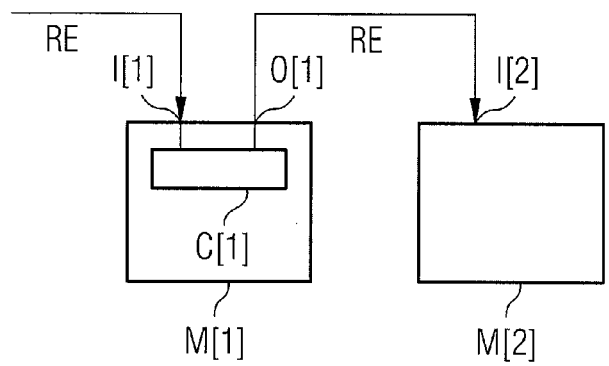
FIG. 1 shows an embodiment of the invention with two modules.

The invention provides a method for distribution for valid random elements to at least two modules. A first module receives valid random elements and determines if valid random elements are passed on to a second module. The first module has access to valid random elements and controls the passing of the valid random elements to the second module.

In an embodiment at least one other module is connected to the second module to form a series connection so that valid random elements can be passed in series from the first module to the second module and to each of the at least one other modules until they reach a last module. To distribute the valid random elements to more than two modules, the modules are connected in series. The valid random elements are sequentially passed through each module starting at the first module and ending at the last module.

In an embodiment each passing module which passes valid random elements on to a receiving module determines if valid random elements are passed to the receiving module. Each passing module is connected to a respective receiving module. As an example, the first module is a passing module and the second module is a receiving module. Because the modules are connected in a series a receiving module will become a passing module when it passes the valid random elements on to the next module. Each passing module controls if valid random elements are passed on to the receiving module or not.

In an embodiment each passing module does not pass valid random elements to the receiving module if the passing module requires valid random elements. If a passing module requires a valid random element for operation, the same valid random element is not passed on to the receiving module connected to the passing module. In this way each valid random element is only used once and in only one of the series connected modules so that there is no correlation of the random elements used in a passing module and a receiving module.

In an embodiment the passing module passes valid random elements to the receiving module if the passing module does not require valid random elements. The valid random elements are not required and are not used by the passing module and can be used by the receiving module for operation. Again the valid random elements are used only in the receiving module and not in the passing module, so that the valid random elements used in both modules are uncorrelated. Because the modules are connected in series, the valid random elements are passed on to each module until a module is reached that requires a valid random element. If none of the modules require valid random elements, the valid random elements are passed on to the last module. In this manner the valid random elements are distributed to all the modules without causing correlation of valid random elements between the modules. Further, the method of distribution is simple and reliable as there is no central control mechanism required to assure that different modules do not receive the same valid random elements. Security certification of the series connected modules is easy as no central control mechanism has to be examined for correct functioning and the un-correlation of the valid random elements is guaranteed by the operating principle.

In an embodiment a respective function in the passing module outputs a signal to indicate if the passing module requires valid random elements. The function supplies the module with its specific functionality and indicates whether or not the module requires valid random elements.

In an embodiment the first module is connected to a source of valid random elements. The source of valid random elements can be any conventional source that provides valid random elements to the chain of series connected modules.

In an embodiment the last module returns a signal to the source of valid random elements to indicate the reception of valid random elements at the last module. The last module thus indicates that all modules requiring valid random elements for operation have received valid random elements. If each module only requires valid random elements once, for example during startup or as a seed, the source of valid random elements can adjust its production of valid random elements.

In an embodiment the source of valid random elements switches into a power conserving mode after receiving the signal from the last module. To conserve power the source of valid random elements can produce random elements at a slower rate while it continues running. The reduction of power consumption is of interest in mobile and battery operated applications, such as a chip card with a security controller.

In an embodiment the valid random elements are delayed when passing through the passing module. The delaying of random elements can be used for synchronizing the random elements and for avoiding spikes and timing problems.

In an embodiment the number of modules between a module and the source of valid random elements is used to determine the priority of the distribution of valid random elements to the modules. The first module is closest to the source of valid random elements and has the highest priority, receiving valid random elements first, while the last module in the series chain of modules has the lowest priority, receiving valid random elements last.

The invention also provides an apparatus for distributing random elements, comprising at least a first module and a second module. The first module receives valid random elements by means of an input. A control unit is connected between the input of the first module and an output of the first module. An input of the second module is connected to the output of the first module. The control unit determines if valid random elements are output to the output of the first module to the input of the second module.

In an embodiment at least one other module is connected in series to the second module with the input of each module being connected to the output of a previous module so that valid random elements are passed in series from the first module to the second module and to each of the at least one other modules until a last module is reached.

In an embodiment each module that passes random elements to another module has a control unit which is connected between its input and its output.

In an embodiment the control unit of each module does not pass valid random elements to its output if a function in the module outputs a signal indicating that it requires valid random values for operation.

In an embodiment valid random elements are passed on to the function if the function outputs the signal.

In an embodiment the control unit of each module passes valid random elements from its input to its output if the function does not output the signal.

In an embodiment the input of the first module is connected to a source of valid random elements.

In an embodiment the source of valid random elements comprises a true random element generator. True random element generators use non-deterministic sources, which can for example be based on radioactive decay or electronic noises and time jitters using direct amplification of a white noise source, jitter oscillator sampling and time discrete chaotic maps, while are more suitable for integrated circuit implementations.

In an embodiment a valid random element detection unit in the last module is connected to the source of valid random elements to indicate that the last module has received valid random elements. The valid random element detection unit can be used to control the output of the source of valid random elements, for example to reduce its power consumption.

In an embodiment valid random elements are transmitted between the modules by means of valid random element lines. The valid random element lines each comprise a random element line and a respective valid line. Each module has an input and an output valid random element line. The respective valid line indicates if the random elements transmitted on the random element line are to be considered valid. The control unit of a passing module imposes a non-valid signal on the respective output valid line if valid random elements are needed for operation in the passing module and imposes a valid signal on the respective output valid line if valid random elements are not needed for operation in the passing module.

In an embodiment at least one of the control units comprises two flip-flops and an AND gate.

In an embodiment random element lines and valid lines are connected to inputs and outputs of the flip-flops in the control unit. The input random element line and valid line are connected to inputs of the flip-flops and the output random element line and valid line are connected to outputs of the flip-flops.

In an embodiment each module is one of a bus encryption module, a pseudo-random number generator, a cryptographic module, a challenge-response authentication module, an initialization module, a key-generating module, a random padding module or a random mask module. Other modules with different functionality requiring random elements can also be used.

In an embodiment the modules are part of a security controller and at least one module is connected to a system bus. A security controller is designed so that its operation is hidden from the outside so that especially keys and algorithms cannot be observed. Further, a security controller is usually protected against manipulation by using methods employing random elements.

In an embodiment the first module is a bus encryption module. Being the first module gives the bus encryption module the highest priority of receiving valid random elements, so that soon after startup of the apparatus the bus encryption module can be used to encrypt system bus communication to protect the communication between system bus connected modules.

The source of valid random elements can be any means for providing valid random elements, the control unit can be any means for controlling the passing of valid random elements and the valid random element detection unit can be any means for detecting random elements.

FIG. 1 shows an embodiment of the invention with two modules. A first module M[1] has an input I[1] and an output O[1]. The first module M[1] comprises a control unit C[1] connected to the input I[1] and the output O[1]. The input I[1] receives valid random elements RE, The output O[1] of the first module is connected to an input I[2] of a second module M[2].

The control unit C[1], a means for controlling the passing of valid random elements RE from the input I[1] to the output O[1], determines if random elements RE are passed from the first module M[1] to the second module M[2]. If the first module M[1] requires valid random elements RE for operation then the random elements RE are not passed on to the second module M[2]. Conversely, if the first module M[1] does not need valid random elements RE for operation, the valid random elements RE are passed from the first module M[1] to the second module M[2]. The operation of the control unit C[1] guarantees that a valid random element RE is only used in the first module M[1] or the second module M[2] but not in both modules. As a result, the valid random elements RE provided to both modules are uncorrelated, leading to uncorrelated results produced by the two modules, as long as the valid random elements RE are supplied to the first module M[1] by a true random element generator.

Figure 2:
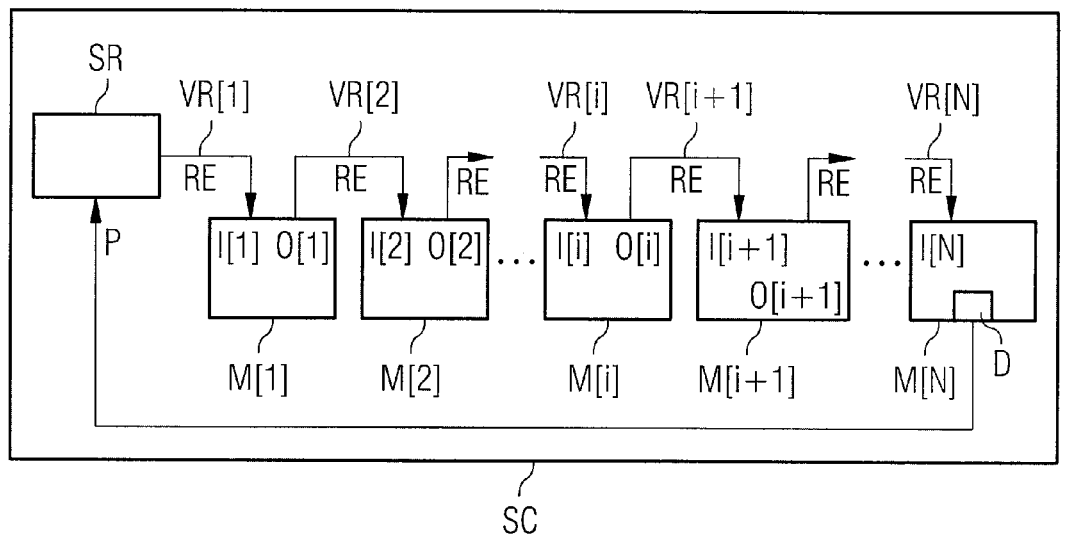
FIG. 2 shows an embodiment of the invention with N modules.

FIG. 2 shows an embodiment of the invention with N modules. A security controller SC comprises the first module M[1] and the second module M[2] as described in FIG. 1. Additionally, further modules M[i], with I=3 . . . N, are added in series to these modules by means of valid random element lines VR[i]. The output O[i] of each module M[i] is connected to the input I[i+1] of the next module M[i+1], with I=1 . . . N−1, so that valid random elements RE can be passed in series from the first module M[1] through all the modules M[i] until the last module M[N] is reached.

The operation of the embodiment shown in FIG. 2 is similar to one described in FIG. 1. Every module M[i] has a control unit C[i], which connects the input I[i] to the output O[i] of the module. It a module M[i] has valid random elements RE at its input I[i] it becomes a passing module, meaning that it can pass valid random elements RE to the module M[i+1] connected through its output O[i], with the module M[i+1] becoming a receiving module. The control unit C[i] in each module passes valid random elements RE to the receiving module M[i+1] if the passing module M[i] does not require valid random elements RE for processing or operation. Conversely, valid random elements RE are not passed by the passing module M[i] to the receiving M[i+1] if the passing module M[i] requires valid random elements RE for processing or operation. The valid random elements RE are thus passed along the series chain of modules M[i] starting at the first module M[1] until a module M[i] is reached that requires valid random elements RE. If valid random elements RE are used in a module M[i] they are not passed on to any other modules. As a consequence the same valid random elements RE are used only in one module M[i], leading to uncorrelated valid random elements RE being distributed along the series connection of modules M[i].

Since the first module M[1] is the first one to receive valid random elements RE it has the highest time priority in receiving valid random elements RE, The last module M[N] has the lowest priority in receiving valid random elements RE. The number of modules M[i] between the source of valid random elements SR and the module itself can be used to allocate priorities in the distribution of valid random elements RE among the modules M[i].

The last module M[N] is provided with a valid random element detection unit D. If the last module M[N] receives a valid random element RE the series structure of the modules M[i] guarantees that all the modules M[1] to M[N−1] do not need or have already received valid random elements RE. This information can be used to feedback a signal P to the source of valid random elements SR to indicate that all the modules M[i] already have had access to valid random elements RE. The source of valid random elements SR can then be adjusted to reduce the rate at which valid random elements RE are output. The reduced rate of outputting valid random elements RE usually leads to a reduction in power consumption, so that the valid random element detection unit D and the signal P can be used to extend battery life in mobile applications. Should any of the modules M[i] again require valid random elements RE, the output of a valid random element required signal S[i], as shown in FIG. 3, from any of the modules M[i] can be used to reset the source of valid random elements SR to provide valid random elements RE at a higher rate again.

Figure 3:
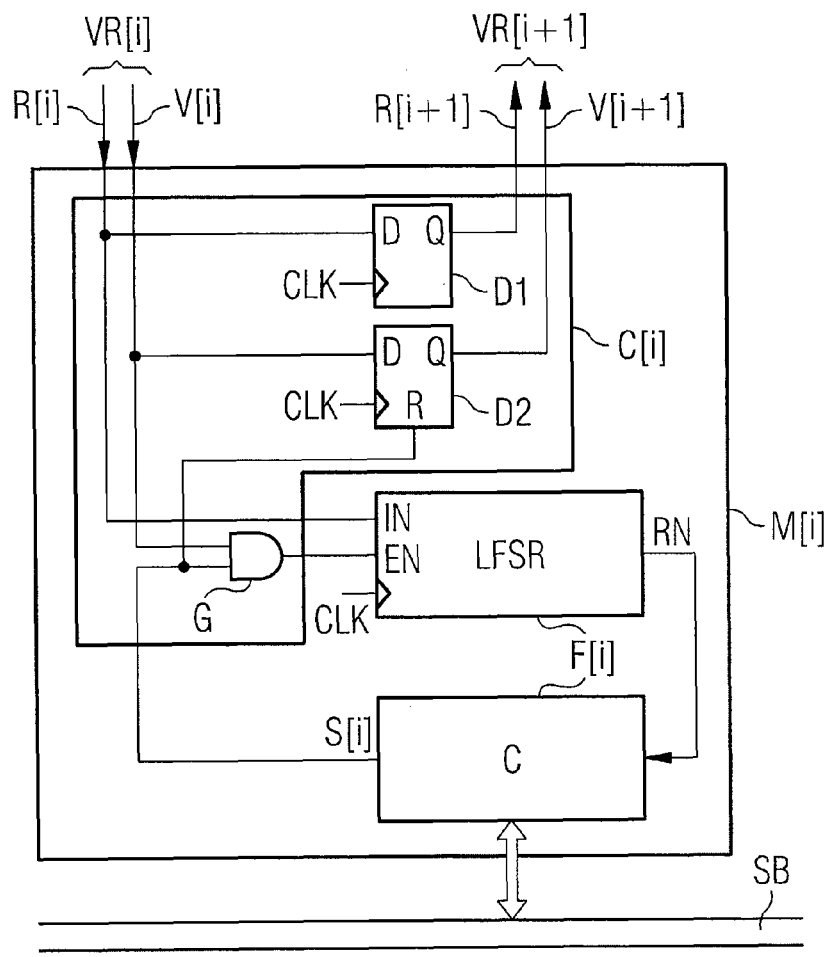
FIG. 3 shows an embodiment of a module.

FIG. 3 shows an embodiment of a module M[i]. The module M[i] comprises a control unit C[i], a function F[i], input lines R[i], V[i] and output lines R[i+1], V[i+1]. The module M[i] is further connected to a system bus SB.

The input valid random data line VR[i] shown in FIG. 2 comprises a random element line R[i] and a valid line V[i], while the output valid random data line VR[i+1] comprises a random element line R[i+1] and a valid line V[i+1]. A random element RE on the valid random data lines VR[i], VR[i+1] is considered to be a non-valid random element if the valid lines V[i], V[i+1] have a first logical level and is considered to be a valid random element if the valid lines V[i], V[i+1] have a second logical level. In the following, the first logical level is chosen to be a high level and the second logical level to be a low level. The signaling on the valid lines V[i], V[i+1] and the random element lines R[i], R[i+1] are described later with FIG. 4.

The function F[i] requires valid random elements for operation and consists, for example, of a linear feedback shift register LFSR with the inputs IN, EN and CLK and having the output RN which is connected to a cryptographic module C. The linear feedback shift register LFSR acts as a post-processing unit and is used to improve the probability distribution of the random words RN that it outputs. The input IN is connected to the random line R[i] which is used as a seed, while the input EN enables the functioning of the linear feedback shift register LFSR. The cryptographic function C uses the random number RN to calculate, for example, a signature key.

A microcontroller which sends commands over the system bus SB to the module M[i] requesting a signature key causes the cryptographic module C to output a valid random element required signal S[i] to indicate that the module M[i] requires valid random elements RE. The valid random element required signal S[i] is passed on to the control unit C[i] and is chosen to be of a high logical level if valid random elements RE are needed by the module M[i] and is chosen to be of a low logical level if valid random elements RE are not needed by the module M[i].

Figure 4:
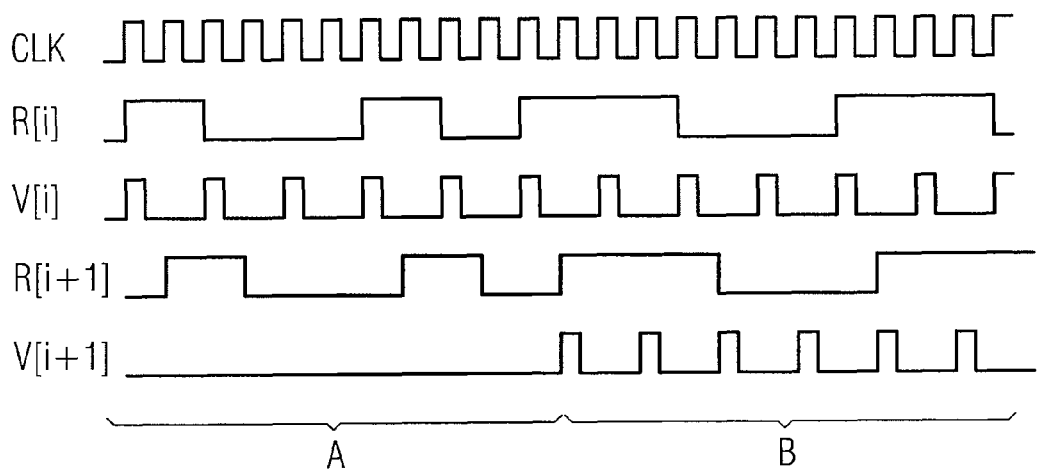
FIG. 4 shows a timing diagram of a module.

The control unit C[i] consists of two D flip-flops D1, D2 and an AND gate G. The first flip-flop D1 has as its input the random element line R[i] and the clock signal CLK. The output Q of the first flip-flop D1 is connected to the random element line R[i+1] and corresponds to the signal R[i] shifted by one clock cycle CLK as shown in FIG. 4. Since the first flip-flop D1 is not affected by the valid random element required signal S[i] the signal on the random element line R[i] is delayed by one clock cycle in each module M[i] and transferred to all the modules M[i] connected in series. The second flip-flop D2 has as inputs the valid line V[i] and the clock signal CLK. Its output Q is connected to the valid line V[i+1]. In contrast to the first flip-flop D1 the second flip-flop D2 has a reset signal R which is connected to the valid random element required signal S[i].

The functioning of the control unit C[i] is illustrated using FIG. 4, which shows the timing signals of the clock CLK, the random lines R[i], R[i+1] and the valid lines V[i], V[i+1]. Shown are the phase A in which the module M[i] requires valid random elements RE and the phase B where the module M[i] does not require valid random elements RE.

In phase A the valid random element required signal S[i] is high so that the reset signal R on the second flip-flop D2 is also high and the output Q of the second flip-flop D2 is low. Since the signal on the valid line V[i+1] is low, the random elements RE on the valid random data line VR[i+1] are not considered to be valid. The valid random elements RE are therefore not passed on to the receiving module M[i+1]. At the same time the valid random element required signal S[i] is input into the AND gate G together with the signal on the valid line V[i]. The linear feedback shift register LFSR thus receives a high signal at its enable input EN if both of the signals applied to the AND gate G are high and is activated so that the signal on the random line R[i], which is always applied to the input IN of the function F[i] is used for the generation of random numbers RN.

In phase B the module M[i] does not require valid random elements RE so that the valid random element required signal S[i] is low. As a result the output of the AND gate G is low and the function F[i] is disabled. At the same time the reset R of the second flip-flop D2 is low so that the signal on the valid line V[i] is passed on to the valid line V[i+1]. As a consequence, the valid random element RE input in the valid random data line VR[i] is not used in the module M[i] but is passed on to the receiving module M[i+1] by means of the valid random data line VR[i+1].

If the module M[i] shown in FIG. 3 is the last module M[N] then no control unit C[N] and no valid random element required signal S[N] is needed as no valid random elements RE are to be passed on to another module. The valid random element detection unit D in the last module M[N] can be realized by AND connecting the inputs random line R[N] and valid line V[N] and using the output of the AND gate for providing the signal P from the last module M[N] for the source of valid random elements SR.

The invention provides a simple and robust mechanism with very little hardware of two D flip-flops and an AND gate per module M[i] that is easy to certify by a security association because its structure assures that each valid random element RE of the valid random element source SR is used by only one module in the chain of modules M[i],

What is claimed is:

1. A method for distribution of valid random elements to at least two modules, comprising:
   a first module;
   a second module connected to the first module; and
   at least one other module connected to the second module to form a series of connected modules,
   wherein the first module receives valid random elements and determines if the valid random elements are passed on to the second module, the valid random elements can be passed in series from the first module to the second module and to each of the at least one other module until the random elements reach a last module, each of the modules which passes a valid random element to a receiving one of the modules determines if the valid random element is passed to the receiving module, and each passing module does not pass the valid random element to the receiving module if the passing module requires a valid random element.

2. The method according to claim 1, wherein the passing module passes the valid random elements to the receiving module if the passing module does not require a valid random element.

3. The method according to claim 2, wherein a function in the passing module outputs a signal to indicate if the passing module requires a valid random element.

4. The method according to claim 3, wherein the first module is connected to a source of valid random elements.

5. The method according to claim 4, wherein the last module returns a signal to the source of valid random elements to indicate reception of a valid random element at the last module.

6. The method according to claim 5, wherein the source of valid random elements switches into a power conserving mode after receiving the signal from the last module.

7. The method according to claim 6, wherein the valid random elements are delayed when passing through the passing module.

8. The method according to claim 7, wherein the number of modules between one of the modules and the source of valid random elements is used to determine a priority of distribution of valid random elements to the one module.

9. The method according to claim 1, wherein each of the valid random elements is used by no more than one of the modules.

10. An apparatus for distributing random elements, comprising:
    at least a first module and a second module, wherein the first module receives valid random elements via an input, and an input of the second module is connected to an output of the first module;
    at least one other module connected in series to the second module, wherein the input of each of the modules is connected to the output of a previous one of the modules so that valid random elements are passed in series from the first module to the second module and to each of the at least one other module until a last module is reached; and
    a control unit comprised in each of the modules and connected between the input and the output of the respective module, wherein the control unit determines if valid random elements are output by the output of the respective module to the input of a next one of the modules,
    wherein the control unit of each module does not pass valid random elements to its output if a function in the respective module outputs a signal indicating that it requires valid random values for operation.

11. The apparatus according to claim 10, wherein valid random elements are passed on to the function if the function outputs the signal.

12. The apparatus according to claim 11, wherein the control unit of each of the modules passes a valid random element from its input to its output if the function does not output the signal.

13. The apparatus according to claim 12, wherein the input of the first module is connected to a source of valid random elements.

14. The apparatus according to claim 13, wherein the source of valid random elements comprises a true random element generator.

15. The apparatus according to claim 14, wherein a valid random element detection unit in the last module is connected to the source of valid random elements to indicate that the last module has received valid random elements.

16. The apparatus according to claim 15, wherein the valid random elements are transmitted between the modules via valid random element lines, each comprising a random element line and a respective valid line, the respective valid line indicating if a random element transmitted on the random element line is valid, and
    wherein the control unit of the respective module that passes valid random elements imposes a non-valid signal on the respective valid line if valid random elements are needed in this module.

17. The apparatus according to claim 16, wherein at least one of the control units comprises two flip flops and an AND gate.

18. The apparatus according to claim 17, wherein the respective random element line and the respective valid line are connected to the inputs and outputs of the flip flops in the control unit.

19. The apparatus according to claim 18, wherein each module is selected from the group consisting of a bus encryption module, a pseudo random number generator, a cryptographic module, a challenge-response authentication module, an initialization module, a key-generating module, a random padding module, and a random mask module.

20. The apparatus according to claim 19, wherein the modules are part of a security controller, and at least one module is connected to a system bus.

21. The apparatus according to claim 20, wherein the first module is a bus encryption module.

22. The apparatus according to claim 10, wherein each of the valid random elements is used by no more than one of the modules.

23. An apparatus for distributing valid random elements, comprising:
    at least a first module and a second module, wherein the first module is connected to a provider of valid random elements and to the second module, and wherein the first module comprises a controller that passes valid random elements from the first module to the second module; and at least one other module connected in series to the second module so that the valid random elements can be passed in series from the first module to the second module and to each of the at least one other modules until a last module is reached, wherein each module that passes random elements to another module has a respective controller, which passes a valid random element to another module if the passing module does not need the valid random element for further operation, and does not pass the valid random element to the another module if the passing module needs valid the random element for further operation.

24. The apparatus according to claim 23, further comprising a detector which detects valid random elements in the last module connected to the provider of valid random elements.

25. The apparatus according to claim 23, wherein each of the valid random elements is used by no more than one of the modules.

* * * * *